United States Patent
Rizzo et al.

(10) Patent No.: US 8,793,443 B2
(45) Date of Patent: Jul. 29, 2014

(54) METHODS AND STRUCTURE FOR IMPROVED BUFFER ALLOCATION IN A STORAGE CONTROLLER

(75) Inventors: James A. Rizzo, Austin, TX (US); Vinu Velayudhan, Fremont, CA (US); Adam Weiner, Henderson, NV (US); Rakesh Chandra, Santa Clara, CA (US); Phillip V. Nguyen, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 231 days.

(21) Appl. No.: 13/432,150

(22) Filed: Mar. 28, 2012

(65) Prior Publication Data

US 2013/0067172 A1 Mar. 14, 2013

Related U.S. Application Data

(60) Provisional application No. 61/532,585, filed on Sep. 9, 2011.

(51) Int. Cl.
*G06F 12/00* (2006.01)

(52) U.S. Cl.
USPC .......................................... 711/148; 711/170

(58) Field of Classification Search
USPC ................................. 711/148, 170
See application file for complete search history.

(56) References Cited

U.S. PATENT DOCUMENTS

| | | | |
|---|---|---|---|
| 6,487,646 B1 | 11/2002 | Adams et al. | |
| 6,651,154 B1 | 11/2003 | Burton et al. | |
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,213,102 B2 | 5/2007 | Buchanan, Jr. et al. | |
| 7,418,550 B2 | 8/2008 | Hetrick et al. | |
| 7,480,941 B1 | 1/2009 | Balasubramaniam et al. | |
| 7,814,065 B2 | 10/2010 | Chan et al. | |
| 7,962,563 B2 * | 6/2011 | Becker-Szendy et al. | .... 709/212 |
| 8,001,242 B2 | 8/2011 | Mild et al. | |
| 8,041,735 B1 | 10/2011 | Lacapra et al. | |
| 8,190,816 B2 | 5/2012 | Balasubramanian | |
| 8,261,003 B2 | 9/2012 | Young et al. | |
| 2002/0103964 A1 | 8/2002 | Igari | |
| 2005/0080874 A1 * | 4/2005 | Fujiwara et al. | .............. 709/217 |

(Continued)

OTHER PUBLICATIONS

"Common RAID Disk Data Format Specification" Version 2.0 Revision 19 SNIA Technical Position Mar. 27, 2009.

(Continued)

*Primary Examiner* — Hashem Farrokh
(74) *Attorney, Agent, or Firm* — Duft Bornsen & Fettig

(57) ABSTRACT

Methods and structure for improved buffer management in a storage controller. A plurality of processes in the controller each transmits buffer management requests to buffer management control logic. A plurality of reserved portions and a remaining non-reserved portion are defined in a shared pool memory managed by the buffer management control logic. Each reserved portion is defined as a corresponding minimum amount of memory of the shared pool. Each reserved portion is associated with a private pool identifier. Each allocation request from a client process supplies a private pool identifier for the associated buffer to be allocated. The buffer is allocated from the reserved portion if there sufficient available space in the reserved portion identified by the supplied private pool identifier. Otherwise, the buffer is allocated if sufficient memory is available in the non-reserved portion. Otherwise the request is queued for later re-processing.

19 Claims, 5 Drawing Sheets

(56) References Cited

U.S. PATENT DOCUMENTS

| | | |
|---|---|---|
| 2005/0097324 A1 | 5/2005 | Mizuno |
| 2005/0125557 A1 | 6/2005 | Vasudevan et al. |
| 2005/0188421 A1 | 8/2005 | Arbajian |
| 2005/0240928 A1 | 10/2005 | Brown et al. |
| 2007/0015589 A1 | 1/2007 | Shimizu |
| 2007/0067497 A1 | 3/2007 | Craft et al. |
| 2007/0210162 A1 | 9/2007 | Keen et al. |
| 2009/0119364 A1 | 5/2009 | Guillon |
| 2009/0222500 A1 | 9/2009 | Chiu et al. |
| 2010/0185874 A1 | 7/2010 | Robles et al. |
| 2010/0191873 A1 | 7/2010 | Diamant |
| 2010/0250699 A1* | 9/2010 | Brown .......................... 709/213 |
| 2010/0274977 A1 | 10/2010 | Schnapp et al. |
| 2011/0178983 A1 | 7/2011 | Bernhard et al. |
| 2011/0225371 A1 | 9/2011 | Spry |
| 2012/0159646 A1 | 6/2012 | Hong Chi et al. |
| 2012/0216299 A1 | 8/2012 | Frank |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

METHODS AND STRUCTURE FOR IMPROVED BUFFER ALLOCATION IN A STORAGE CONTROLLER

RELATED PATENTS

This patent application is related to the following commonly owned United States patent applications, all filed on the same date herewith and all of which are herein incorporated by reference:

U.S. patent application Ser. No. 13/432,131, entitled METHODS AND STRUCTURE FOR TASK MANAGEMENT IN STORAGE CONTROLLERS OF A CLUSTERED STORAGE SYSTEM;

U.S. patent application Ser. No. 13/432,213, entitled METHODS AND STRUCTURE FOR IMPROVED PROCESSING OF I/O REQUESTS IN FAST PATH CIRCUITS OF A STORAGE CONTROLLER IN A CLUSTERED STORAGE SYSTEM;

U.S. patent application Ser. No. 13/432,223, entitled METHODS AND STRUCTURE FOR LOAD BALANCING OF BACKGROUND TASKS BETWEEN STORAGE CONTROLLERS IN A CLUSTERED STORAGE ENVIRONMENT;

U.S. patent application Ser. No. 13/432,225, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;

U.S. patent application Ser. No. 13/432,232, entitled METHODS AND STRUCTURE FOR IMPLEMENTING LOGICAL DEVICE CONSISTENCY IN A CLUSTERED STORAGE SYSTEM;

U.S. patent application Ser. No. 13/432,238, entitled METHODS AND STRUCTURE FOR IMPROVED I/O SHIPPING IN A CLUSTERED STORAGE SYSTEM;

U.S. patent application Ser. No. 13/432,220, entitled METHODS AND STRUCTURE FOR MANAGING VISIBILITY OF DEVICES IN A CLUSTERED STORAGE SYSTEM; and U.S. patent application Ser. No. 13/432,138, entitled METHODS AND STRUCTURE FOR RESUMING BACKGROUND TASKS IN A CLUSTERED STORAGE ENVIRONMENT.

BACKGROUND

1. Field of the Invention

The invention relates generally to storage systems and more specifically relates to methods and structure for efficient, reliable buffer allocation for processing within a storage controller of a clustered storage system.

2. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

In many high-performance, high-reliability storage systems, the storage controllers have numerous processes operable to process corresponding aspects of received I/O requests. These various processes have a number of uses for allocating buffers in performing their respective processes. One process may allocate a buffer to copy a portion of an I/O request for its use while other processes may allocate buffers to build data structures used in processing the request. In a clustered storage environment where a plurality of storage controllers engage in close cooperation in processing requests to logical volumes they own and to transfer such ownership, still other processes may build structures used when shipping (transferring) an I/O request to another controller for processing or in communicating with other controllers with regard to ownership of a logical volume.

Each process may be designed in the controller logic with some dedicated block of memory that the corresponding process manages on its own. However, such a fixed allocation of memory to each process does not provide flexibility where some processes require more memory at times while others may require less. Thus, such a fixed allocation may be wasteful of memory in that a maximum capacity of memory that may be required for each process will be allocated to assure each process can continue processing even though it may not need that maximum amount. It is therefore often preferred that buffers be allocated (and freed) for each of the various processes using some common pool of available memory. Each process may then allocate buffers as needed and release the allocated buffers when no longer required. Numerous issues arise in allocating buffers for multiple processes from a common pool in view of the varying requirements for each process over time. Deadlock situations must be avoided such that two or more tasks cannot proceed in processing because each is waiting to allocate more memory and no task is ready to release/free its memory to make more buffers available. Further, performance of the storage controller can be impacted by buffer allocation in a common pool. For example, a process may be stalled waiting for other processes to release buffers. Still further, performance may be impacted if the process awaiting more buffer allocation is constantly retrying its allocation. Such a "polling" loop structure may consume valuable processing resources within the controller.

Thus it is an ongoing challenge to provide for efficient buffer allocation in a storage controller that avoids deadlock and performance problems.

SUMMARY

The present invention solves the above and other problems, thereby advancing the state of the useful arts, by providing methods and structure for improved buffer management in a storage controller. A plurality of processes in the controller each transmit buffer management requests to buffer management control logic of the controller. A plurality of reserved portions and a remaining non-reserved portion are defined in a shared pool memory managed by the buffer management control logic. Each reserved portion is defined as a corresponding minimum amount of memory of the shared pool. Each reserved portion is associated with a private pool identifier. Each allocation request from a client process supplies a private pool identifier for the associated buffer to be allocated. The buffer is allocated from the reserved portion if there sufficient available space in the reserved portion identified by the supplied private pool identifier. Otherwise, the buffer is allocated if sufficient memory is available in the non-reserved portion. Otherwise the request is queued for later re-processing.

In one aspect hereof, a method is provided for buffer allocation in a storage controller to manage buffers in a shared pool of memory. The method comprises providing a plurality of private pool identifiers for buffers to be allocated within the shared pool wherein each private pool identifier is associated with a minimum amount of reserved memory in the shared pool for said each private pool identifier. The method further comprises receiving a request to allocate a buffer from the shared pool, the request comprising a requested private pool identifier. Responsive to receipt of the request, the method determines whether a presently allocated amount of memory associated with the requested private pool identifier is below the minimum amount of reserved memory associated with the requested private pool identifier. Responsive to determining that the presently allocated amount of memory associated with the requested private pool identifier is below the minimum amount of reserved memory associated with the requested private pool identifier, the method allocates the buffer from the shared pool and associates the allocated buffer with the requested private pool identifier. Responsive to determining that the presently allocated amount of memory associated with the requested private pool identifier is not below the minimum amount of reserved memory associated with the requested private pool identifier, the method determines whether sufficient non-reserved memory is available in the shared pool to allocate the requested buffer. Responsive to determining that sufficient non-reserved memory is presently available in the shared pool, the method allocates the buffer from the shared pool and associates the allocated buffer with the private pool identifier.

Another aspect hereof provides a method operable in a storage controller to manage buffers in a shared pool of memory. The method comprises defining a plurality of reserved portions in the shared pool. Each reserved portion has an associated minimum size. Each reserved portion is associated with a corresponding private pool identifier. A remaining portion of the shared pool comprises non-reserved memory. The method further comprises receiving a request to allocate a buffer wherein the request comprises a requested private pool identifier indicating a corresponding reserved portion with which the buffer is to be associated. The method allocates the buffer if a presently allocated amount of memory associated with the reserved portion associated with the requested private pool identifier is less than the associated minimum size or if sufficient non-reserved memory is available and the presently allocated amount of memory associated with the reserved portion associated with the requested private pool identifier is not less than the associated minimum size. The allocated buffer is associated with the requested private pool identifier.

Yet another aspect hereof provides a storage controller comprising a plurality of cooperating processes operable on one or more processors of the controller wherein each process allocates and frees buffers for use in its processing. The controller further comprises a shared pool of memory comprising a plurality of reserved portions and a portion of non-reserved memory. Each of the portions comprises one or more buffers adapted for use by the plurality of cooperating processes. Each reserved portion has an associated minimum size and each reserved portion is associated with a corresponding private pool identifier. The controller further comprises buffer management control logic communicatively coupled with each of the plurality of processes. Each of the plurality of processes is adapted to transmit to the buffer management control logic one or more requests to allocate buffers. Each request to allocate a buffer comprises a requested private pool identifier indicating a corresponding reserved portion with which the buffer is to be associated. The buffer management control logic, responsive to receipt of a request to allocate a buffer, is adapted to allocate the buffer if a presently allocated amount of memory associated with the reserved portion associated with the requested private pool identifier is less than the associated minimum size or if sufficient non-reserved memory is available and the presently allocated amount of memory associated with the reserved portion associated with the requested private pool identifier is not less than the associated minimum size. The allocated buffer is associated with the requested private pool identifier.

DETAILED DESCRIPTION OF THE DRAWINGS

Figure 1:
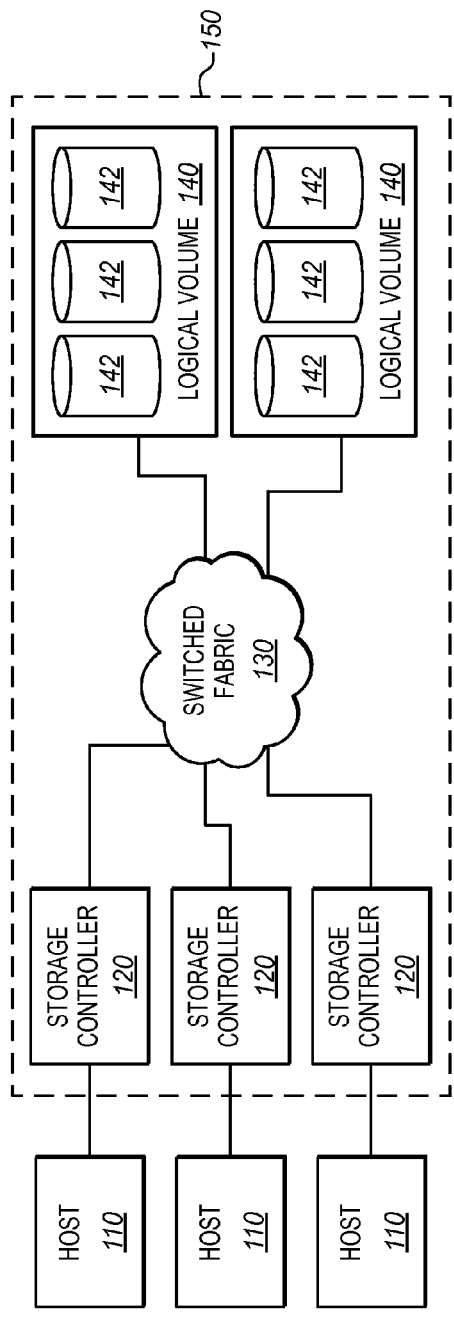
FIG. 1 is a block diagram illustrating an example of a prior art clustered storage system.
Figure 2:
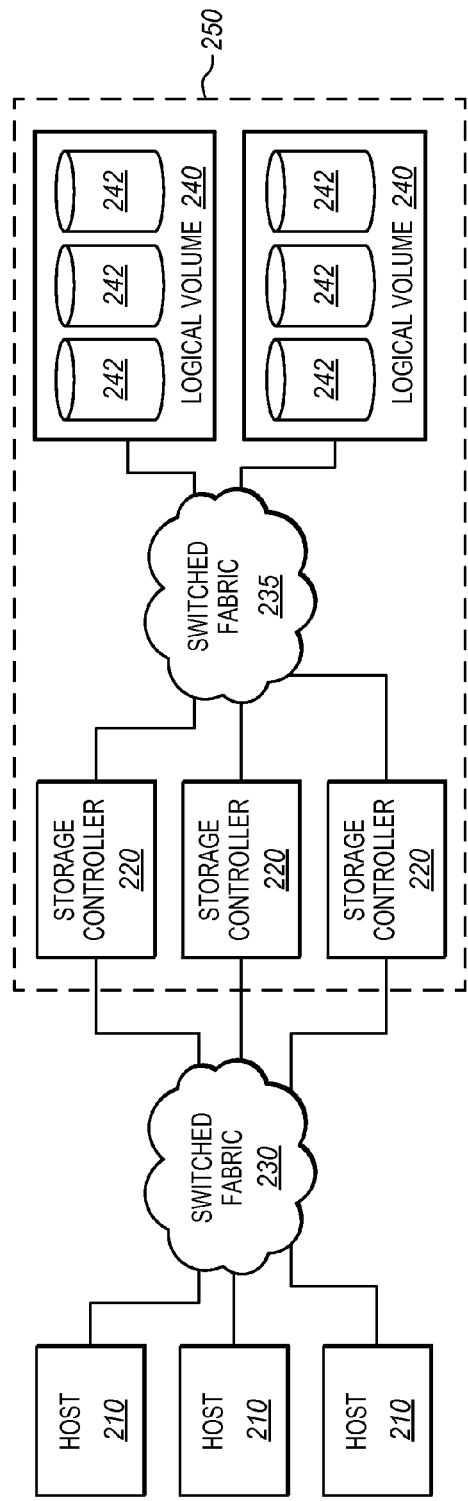
FIG. 2 is a block diagram illustrating another example of a prior art clustered storage system.
Figure 3:
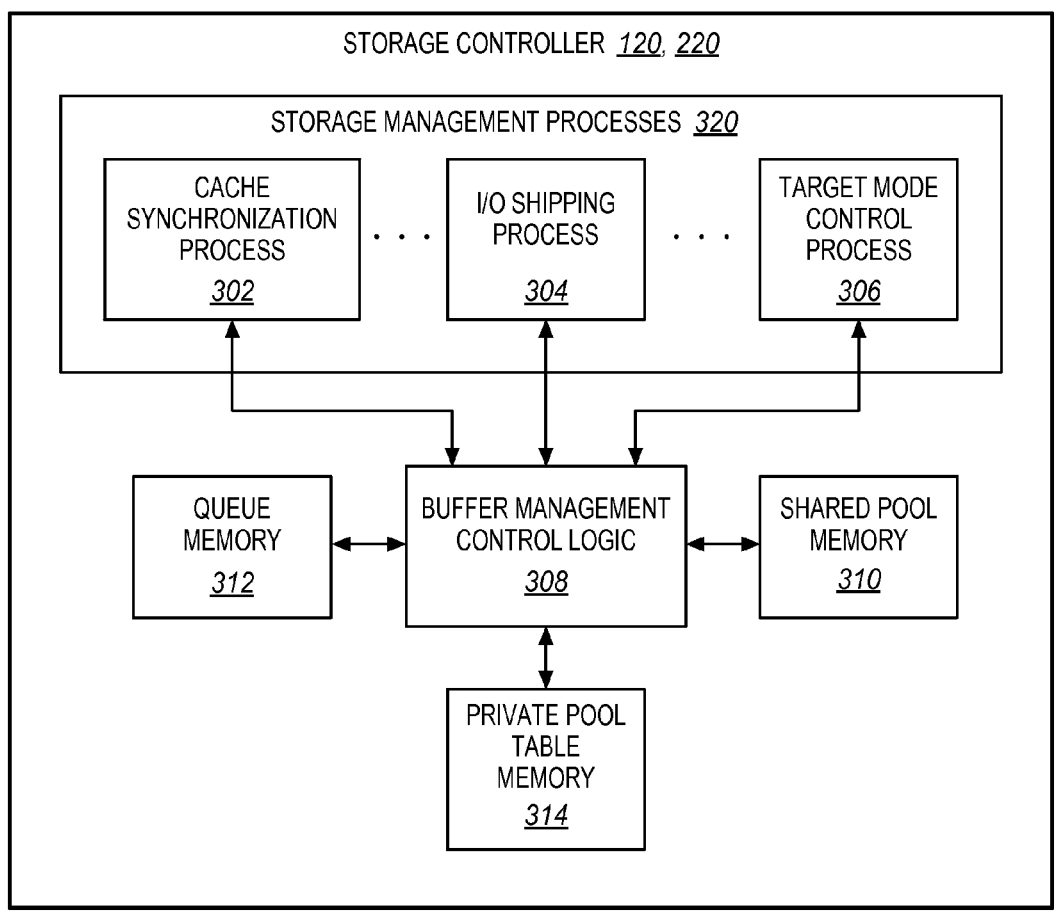
FIG. 3 is a block diagram of an exemplary enhanced storage controller such as may be used to enhance the clustered storage systems of FIGS. 1 and 2 to provide improved buffer management in accordance with features and aspects hereof.

FIG. 3 is a block diagram of an exemplary embodiment of a storage controller (e.g. controller 120 or 220 of FIGS. 1 and 2, respectively) enhanced in accordance with features and aspects hereof to provide efficient buffer allocation. Controller 120/220 comprises a plurality of storage management processes 320 operable on one or more processors (not shown) of the controller. Each exemplary process issues buffer management requests to buffer management control logic 308 of controller 120/220. Each exemplary process (302, 304, and 306) as well as control logic 308 may be a process operable on one or more general or special purpose processors within the controller implemented as suitably programmed instructions executed by the processor. In other exemplary embodiments, processes 320 and/or logic 308 may be implemented as suitably designed custom circuitry. In still other exemplary embodiments, processes 320 and/or logic 308 may be implemented as combinations of programmed instructions and suitable custom circuitry. The exemplary processes depicted are exemplary, typical processes operable within a storage controller in a clustered storage environment. For example, cache synchronization process 302 may allocate buffers for communicating cache synchronization information among the plurality of clustered storage controllers. I/O shipping process 304 may allocate buffers for purposes of transmitting a received I/O request to another storage controller that presently owns or controls an addressed logical device. Target mode control process 306 may allocate buffers for purposes of receiving information from other controllers of the storage cluster (e.g., receiving cache synchronization information, receiving a shipped I/O request, receiving transfer of logical device ownership, receiving or generating task management requests to abort I/O operations, etc.). Those of ordinary skill in the art will recognize numerous processes that may be operable within an enhanced storage controller for which buffers may be allocated and freed as required. Thus, the exemplary processes shown are merely intended to suggest typical processes in one exemplary embodiment of storage controller 120/220 in the context of a clustered storage system.

Controller 120/220 comprises a shared pool memory 310 coupled with buffer management control logic 308. Logic 308, responsive to requests from processes 320, allocates and frees buffers within shared pool memory 310 for use by the requesting processes. Shared pool memory 310 may utilize any suitable memory component such as dynamic random access memory (DRAM). Further, as the matter of design choice, shared pool memory 310 may simply be an allocated segment of memory utilized for other purposes within controller 120/220. Responsive to receipt of a request from a process to allocate a buffer for that process to utilize, control logic 308 allocates an appropriate buffer within shared pool memory 310 and returns the allocated buffer to the requesting process.

In accordance with features and aspects hereof, control logic 308 initializes by reserving portions of shared pool memory 310 leaving a remaining non-reserved portion. Logic 308 associates each reserved portion of memory 310 with a corresponding private pool identifier. Each reserved portion is defined as a minimum amount of memory 310 to be reserved for the corresponding, associated private pool identifier. The amount of minimum amount of memory may be specified by logic 308 as a minimum number of buffers to be reserved (e.g., where all buffers are of equal size). In other exemplary embodiments, the minimum amount of memory reserved for each private pool identifier may be specified as a minimum number of bytes (or other units of measure) (e.g., where buffers may be allocated of varying sizes). Each allocation request received by logic 308 from one of the plurality of processes 320 comprises a private pool identifier indicating which of the reserved portions should be utilized first for allocation of requested buffer. In some embodiments, where buffers may be allocated of varying sizes, the allocation request may further comprise the requested size for the buffer to be allocated.

By reserving a minimum amount of memory in the shared pool memory as a reserved portion corresponding to each private pool identifier, deadlock conditions may be avoided where various processes require a minimum amount of memory to assure continued operation. For example, an I/O request process may allocate buffers used for I/O requests queued for processing within the storage controller. Another process (e.g., a "task manager" process) may be adapted to manage the aborting of presently active or queued I/O requests and may allocate buffers for its task management processing. If all buffers in a shared pool are presently allocated for the I/O request processing task, the task management process may be unable to allocate its required buffers to process the aborting of I/O request—thus resulting in a deadlock condition. In accordance with features and aspects hereof, such a task management process may utilize a first private pool identifier associated with a reserved portion of the shared pool memory and the I/O request process may utilize a different private pool identifier associated with a different reserved portion of the shared pool memory. Thus, in accordance with the enhancements hereof, the task manager process cannot be deadlock out of its processing by the I/O request process. reserved portion Further, defining and utilizing reserved portions associated with each corresponding private pool identifier helps to improve performance in various conditions by allowing more rapid allocation without the more generalized overhead required in the buffer management of prior techniques for deadlock. Since the minimum amount of memory specifies only a minimum to be reserved, a process may still allocate more buffers as needed from the non-reserved portion of the shared pool memory.

In operation, responsive to receipt of a buffer allocation request from one of the plurality of processes 320, control logic 308 determines whether the presently allocated amount of memory associated with the identified private pool is less than the minimum amount of memory designated for the reserved portion associated with the private pool identifier specified in the allocation request. If so, logic 308 allocates the requested buffer immediately for use by the requesting process. If the presently allocated amount of memory associated with the identified private pool is greater than or equal to the designated minimum for the reserved portion associated with the requested private pool, logic 308 attempts to allocate the requested buffer from the remaining non-reserved portion of shared pool memory 310. Thus, requests from each of the plurality of processes 320 may first be satisfied from a respective reserved portion associated with the identified private pool indicated in the allocation request. If the request cannot be satisfied in the reserved portion, all processes may share access to the remaining non-reserved portion if the reserved portion for its private pool has been exhausted.

To aid logic 308 in managing buffer allocation. Controller 120/220 may further comprise private pool table memory 314 coupled with logic 308 to store information regarding definition of the reserved portions and the non-reserved portion in shared pool memory 310. Memory 314 may comprise any suitable memory such as DRAM and may be integral with other memory components such as memories 312 and 310. Each entry in such a table may define a corresponding reserved portion including indicia of the associated private pool identifier, the minimum amount of memory reserved for that reserved portion, an a counter of the presently allocated amount of memory for that reserved portion. The counter in such an entry may be incremented and decremented as buffers associated with the corresponding private pool identifier are allocated and freed, respectively.

Further, if control logic 308 determines that sufficient memory is presently not available in either the reserved portion for the identified private pool or in the non-reserved portion of shared pool memory 310, logic 308 queues the allocation request in the queue memory 312 to await the freeing of previously allocated buffers. Queue memory 312 may comprise any suitable memory including, for example, DRAM. Further, queue memory 312 may be integral with other memories of controller 120/220 and defined as a designated portion of the memory utilized for shared pool memory 310 and/or utilized for other data within controller 120/220. When a process completes its use of an allocated buffer, it transmits a request to buffer management control logic 308 to free the previously allocated buffer. Responsive to such a request, logic 308 returns the previously allocated buffer for reallocation within shared pool memory 310. Further, control logic 308 determines whether any previous allocation requests have been queued in queue memory 312. If not, the request to free a previously allocated buffer is completed. Otherwise, control logic 308 un-queues a previously queued request for a previous allocation request that could not be satisfied at the time the request was made. The un-queued request is then re-processed to again attempt allocation of the requested buffer. If the buffer allocation request is re-processed satisfactorily, the queued request is removed from queue memory 312 and completed normally as described above. Further exemplary details of operation of control logic 308 are presented herein below with respect to other figures.

Those of ordinary skill in the art will readily recognize numerous additional and equivalent elements that may be present in fully functional controllers 120/220. Such additional and equivalent elements are omitted here in for simplicity and brevity of this discussion.

Figure 4:
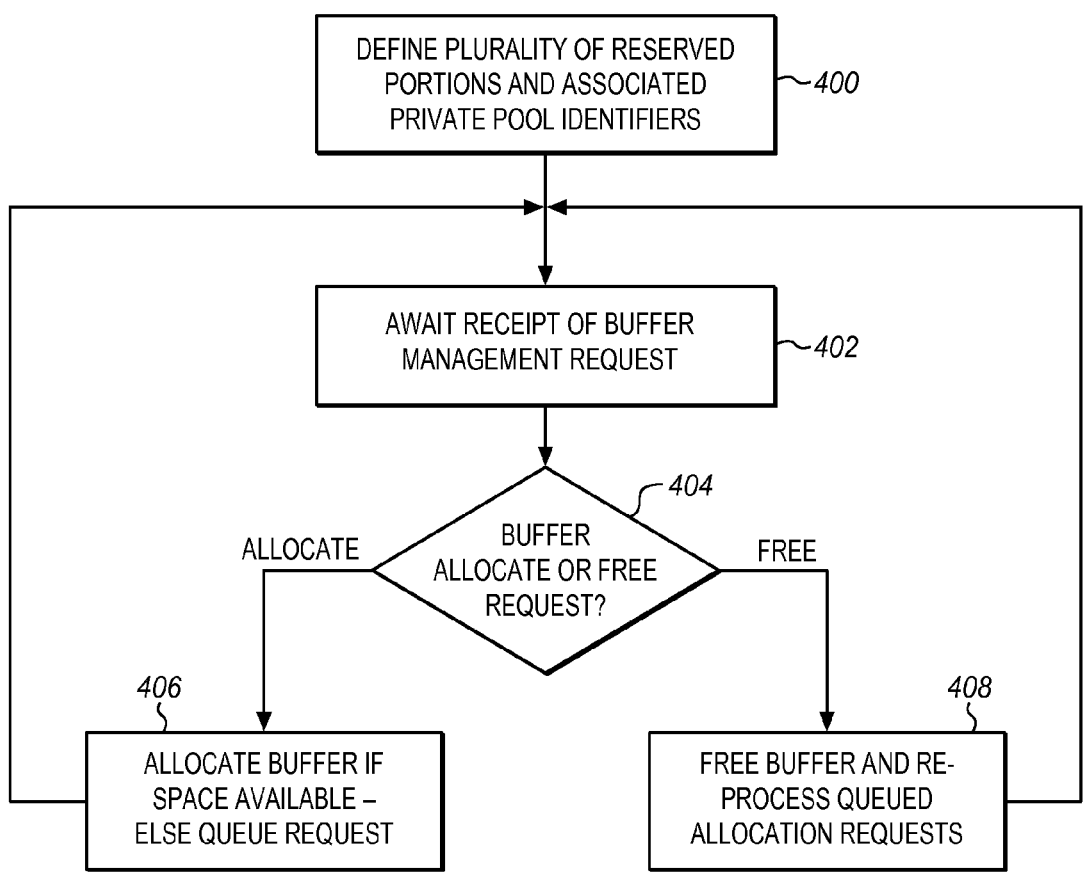
FIGS. 4 through 6 are flowcharts describing exemplary methods for improved buffer management in a storage controller such as that of FIG. 3 in accordance with features and aspects hereof.

FIG. 4 is a flowchart describing an exemplary method for improved buffer management in accordance with features and aspect hereof. The method of FIG. 4 may be operable in an enhanced storage controller such as controller 120/220 of FIGS. 1 through 3 and more specifically may be operable in buffer management control logic 308 of FIG. 3. Step 400 represents initialization processing that defines a plurality of reserved portions in a shared pool memory. In addition, a private pool identifier is associated with each of the reserved portions. A reserved portion is defined, in essence, by defining a minimum amount of memory to be reserved for allocation of buffers associated with a private pool identifier which is, in turn, associated with the reserved portion. As noted above, the minimum amount of memory may be defined as a number of buffers (e.g., where all buffers are of equal size) or may be defined as a number of bytes or other units of data (e.g., where buffers may be allocated of varying sizes). Steps 402 through 408 are then iteratively operable within the buffer management control logic of the storage controller.

Step 402 awaits receipt of a next buffer management request. Step 404 then determines whether the received buffer management request is a request to allocate a buffer or a request to free a previously allocated buffer. If the request is to allocate a new buffer, step 406 allocates the buffer if sufficient space is located in the shared pool memory using the supplied private pool indicator. If insufficient memory is available to satisfy the buffer allocation request, the request is queued for later re-processing. Processing then continues looping back to step 402 to await receipt of a next buffer management request. If step 404 determines that the received buffer management request requested freeing of a previously allocated buffer, step 408 frees the identified previously allocated buffer and re-processes any queued requests from previously received buffer allocation requests that could not be completed earlier.

Figure 5:
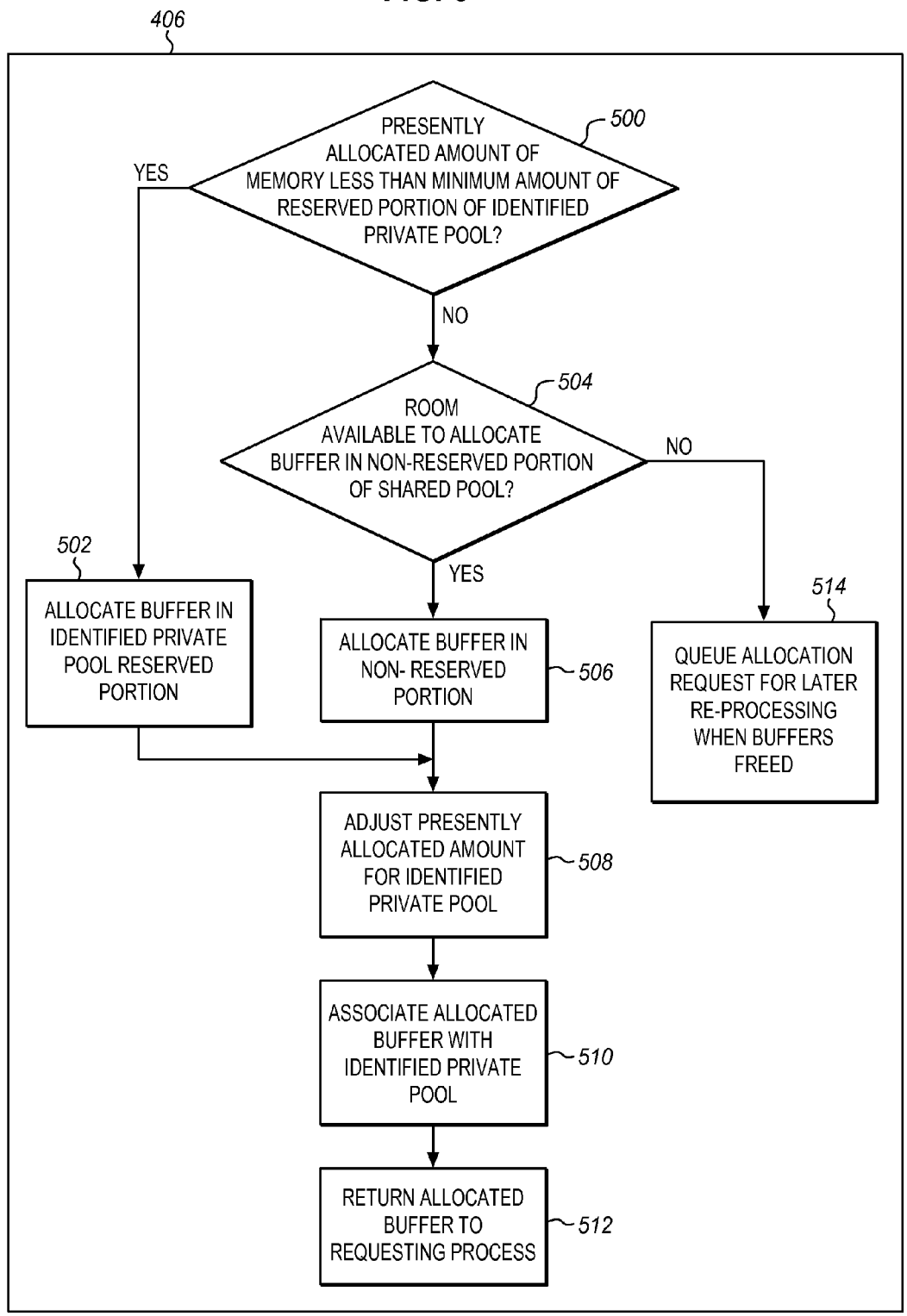

As noted above, features and aspects hereof provide for reserved portions of the shared pool memory such that a private pool identifier supplied with each buffer allocation request may indicate a reserved portion to be utilized first for satisfying the buffer allocation request. FIG. 5 is a flowchart providing exemplary additional details of the enhanced buffer allocation management of step 406 of FIG. 4 wherein the reserved portion associated with a private pool identifier supplied with a buffer allocation request is utilized first to allocate the requested buffer. At step 500, buffer management control logic determines whether the presently allocated amount of memory for the identified private pool supplied in the buffer allocation request is less than the minimum amount of memory reserved in the reserved portion associated with the supplied private pool identifier of the request. Step 500 may use a presently allocated counter and a minimum amount of memory in a table entry for the identified pool to make the determination. If step 500 determines that the allocation may be made from the reserved portion, the requested buffer is allocated at step 502 utilizing the reserved portion associated with the identified private pool. Step 508 then adjusts the presently allocated amount for the identified private pool to indicate that another buffer has been allocated from the identified private pool. The adjustment may comprise incrementing the count of the number of buffers presently allocated in the associated private pool reserved portion. Alternatively, the adjustment may comprise incrementing a counter of the total number of bytes of memory allocated for all buffers presently allocated in association with the identified private pool.

Step 510 associates the allocated buffer with the private pool identifier supplied in the allocation request. In some exemplary embodiments, the requesting ("client") process may be responsible for maintaining the association of the allocated buffer with the identified private pool identifier. The requesting process assures that the private pool identifier used to request allocation remains associated with the allocated buffer for purposes of later freeing. In other embodiments, the buffer management control logic may assure that the allocated buffer is associated with the requested private pool identifier. For example, a table may be maintained by the control logic having an entry for every buffer allocated from the shared pool memory. The entry for an allocated buffer may indicate the private pool identifier that the buffer is associated with. In such an embodiment, step 510 updates the table entry for the allocated buffer to indicate the private pool identifier associated with the buffer.

Step 512 then returns the allocated buffer to the requesting process to complete processing of step 406.

If step 500 determines that the minimum amount of memory for the reserved portion of the identified private pool is exceeded by the presently allocated amount of memory for that private pool, step 504 next determines whether sufficient memory is available to allocate the buffer in the non-reserved portion of the shared pool memory. If so, step 506 allocates the buffer in the non-reserved portion of the shared pool memory. Steps 508, 510, and 512 are then operable as discussed above to adjust the presently allocated counter for the identified private pool (e.g. by appropriately incrementing a counter), associating the allocated buffer with the requested private pool identifier, and returning the allocated buffer to the requesting process. If step 504 determines that insufficient space is available in the non-reserved portion of the shared pool memory, step 514 queues the allocation request for later re-processing following freeing of previously allocated buffers.

Figure 6:
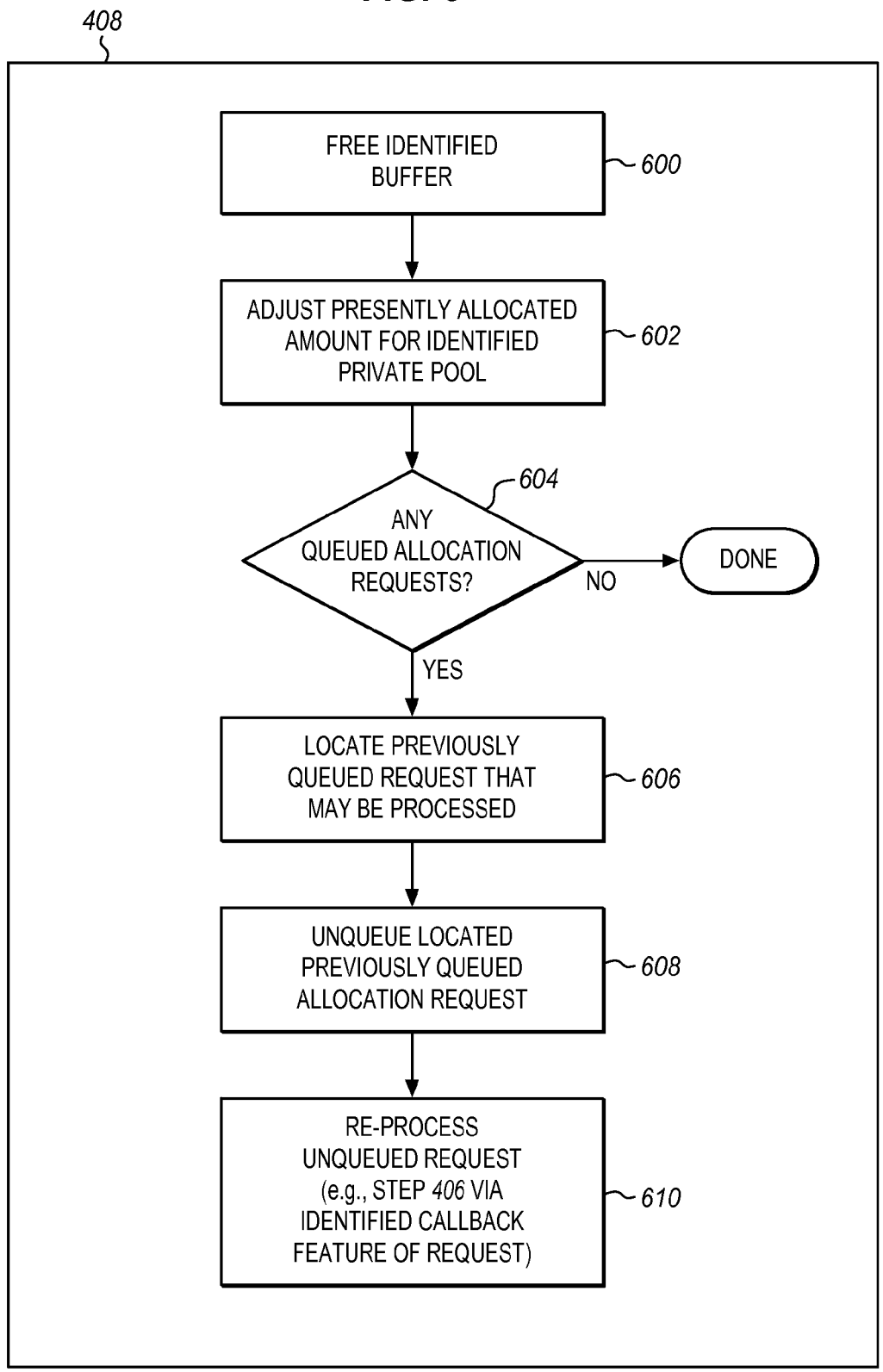

FIG. 6 is a flowchart providing exemplary additional details of the processing of step 408 of FIG. 4 in accordance with features and aspect hereof to free a previously allocated buffer. At step 600, buffer management control logic frees the identified buffer returning it for further allocation from the shared pool memory. Step 602 adjusts the presently allocated amount of memory for the identified private pool from which the buffer just freed was previously allocated. As noted above, the adjustment may comprise decrementing a counter of the number of buffers presently allocated for the identified private pool or may comprise decrementing a counter of the number of bytes presently allocated in the identified private pool. At step 604, control logic determines whether any previous allocation requests have been queued for later re-processing. If not, processing of step 408 is complete. Otherwise, step 606 locates a previously queued allocation request that may be re-processed at this time. In an exemplary embodiment, where all buffers are allocated having the same size, the next queued request (e.g., the top or oldest queued request) may be selected by the processing of step 606. In other embodiments where buffers may be allocated such that each may have a preferred or desired size for the intended application, step 606 may locate the next queued request requesting a buffer size less than or equal to the size of the buffer just freed. Having located such a next queued request, step 608 un-queues the previously queued allocation request and step 610 re-processes the un-queued buffer allocation request (e.g., by repeating the processing of step 406 discussed above).

In some exemplary embodiment, re-processing of the un-queued request may comprise utilizing a callback feature supplied in the original buffer allocation request. The callback feature may include a callback indicator in the allocation request. The callback indicator may be specified as a function to be invoked within the requesting process signaling the process that its buffer may now be allocated. In other exemplary embodiments the callback feature may comprise indicia of a semaphore to be set by the processing of step 610 such that the requesting process is signaled to again attempt its buffer allocation request.

Those of ordinary skill in the art will recognize numerous additional and equivalent elements that may be present in a fully functional method such as the methods of FIGS. 4 through 6. Such additional and equivalent elements are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage controller to manage buffers in a shared pool of memory, the method comprising:
   providing a plurality of private pool identifiers for buffers to be allocated within the shared pool wherein each private pool identifier is associated with a minimum amount of reserved memory in the shared pool for said each private pool identifier;
   receiving a request to allocate a buffer from the shared pool, the request comprising a requested private pool identifier;
   responsive to receipt of the request, determining whether a presently allocated amount of memory associated with the requested private pool identifier is below the minimum amount of reserved memory associated with the requested private pool identifier;
   responsive to determining that the presently allocated amount of memory associated with the requested private pool identifier is below the minimum amount of reserved memory associated with the requested private pool identifier, allocating the buffer from the shared pool and associating the allocated buffer with the requested private pool identifier; and
   responsive to determining that the presently allocated amount of memory associated with the requested private pool identifier is not below the minimum amount of reserved memory associated with the requested private pool identifier, determining whether sufficient non-reserved memory is available in the shared pool to allocate the requested buffer; and
   responsive to determining that sufficient non-reserved memory is presently available in the shared pool, allocating the buffer from the shared pool and associating the allocated buffer with the private pool identifier.

2. The method of claim 1 further comprising:
   responsive to determining that sufficient non-reserved memory is not presently available in the shared pool, performing the additional steps of:
   awaiting freeing of previously allocated buffers; and
   re-processing the request to allocate the buffer.

3. The method of claim 1 further comprising:
   responsive to determining that sufficient non-reserved memory is not presently available in the shared pool, queuing the request to allocate the buffer;
   receiving a request to free a previously allocated buffer; and
   responsive to receipt of the request to free a previously allocated buffer, re-processing a previously queued request to allocate a buffer.

4. The method of claim 3
wherein the request to allocate the buffer further comprises a callback signal identifier,
wherein the step of re-processing further comprises applying a signal, using the callback signal identifier of the queued request being re-processed, to a requesting process that generated the queued request being re-processed wherein the signal indicates to the requesting process that the buffer has been allocated.

5. The method of claim 4
wherein the callback signal identifier comprises a callback semaphore identifier, and
wherein the step of applying a signal further comprises setting a semaphore indicated by the callback semaphore identifier.

6. The method of claim 4
wherein the callback signal identifier comprises a callback function identifier, and
wherein the step of applying a signal further comprises invoking a function indicated by the callback function identifier.

7. The method of claim 1
wherein all allocated buffers are equal in size.

8. A method operable in a storage controller to manage buffers in a shared pool of memory, the method comprising:
defining a plurality of reserved portions in the shared pool, wherein each reserved portion has an associated minimum size, wherein each reserved portion is associated with a corresponding private pool identifier, and wherein a remaining portion of the shared pool comprises non-reserved memory;
receiving a request to allocate a buffer wherein the request comprises a requested private pool identifier indicating a corresponding reserved portion with which the buffer is to be associated;
allocating the buffer if a presently allocated amount of memory associated with the reserved portion associated with the requested private pool identifier is less than the associated minimum size or if sufficient non-reserved memory is available and the presently allocated amount of memory associated with the reserved portion associated with the requested private pool identifier is not less than the associated minimum size; and
associating the allocated buffer with the requested private pool identifier.

9. The method of claim 8 further comprising:
adjusting the presently allocated amount of memory associated with the reserved portion associated with the requested private pool identifier responsive to allocation of the buffer.

10. The method of claim 9 further comprising:
receiving a request to free a previously allocated buffer;
determining the private pool identifier with which the previously allocated buffer is associated; and
adjusting the presently allocated amount of memory associated with the reserved portion associated with the determined private pool identifier responsive to receiving the request to free the previously allocated buffer.

11. The method of claim 10 further comprising:
queuing the request to allocate if: there is insufficient non-reserved memory in the shared pool to allocate the buffer and the presently allocated amount of memory associated with the reserved portion associated with the requested private pool identifier is not less than the associated minimum size; and
responsive to receipt of the request to free, re-processing a previously queued request to allocate.

12. The method of claim 11
wherein the request to allocate the buffer further comprises a callback signal identifier,
wherein the step of re-processing further comprises applying a signal, using the callback signal identifier of the queued request being re-processed, to a requesting process that generated the queued request being re-processed wherein the signal indicates to the requesting process that the buffer has been allocated.

13. The method of claim 11
wherein the callback signal identifier comprises a callback semaphore identifier, and
wherein the step of applying a signal further comprises setting a semaphore indicated by the callback semaphore identifier.

14. The method of claim 11
wherein the callback signal identifier comprises a callback function identifier, and
wherein the step of applying a signal further comprises invoking a function indicated by the callback function identifier.

15. A storage controller comprising:
a plurality of cooperating processes operable on one or more processors of the controller wherein each process allocates and frees buffers for use in its processing;
a shared pool of memory comprising a plurality of reserved portions and a portion of non-reserved memory, each of the portions comprising one or more buffers adapted for use by the plurality of cooperating processes, wherein each reserved portion has an associated minimum size, wherein each reserved portion is associated with a corresponding private pool identifier; and
buffer management control logic communicatively coupled with each of the plurality of processes,
wherein each of the plurality of processes is adapted to transmit to the buffer management control logic one or more requests to allocate buffers, wherein each request to allocate a buffer comprises a requested private pool identifier indicating a corresponding reserved portion with which the buffer is to be associated,
wherein the buffer management control logic, responsive to receipt of a request to allocate a buffer, is adapted to allocate the buffer if a presently allocated amount of memory associated with the reserved portion associated with the requested private pool identifier is less than the associated minimum size or if sufficient non-reserved memory is available and the presently allocated amount of memory associated with the reserved portion associated with the requested private pool identifier is not less than the associated minimum size; and
associating the allocated buffer with the requested private pool identifier.

16. The controller of claim 15
wherein the buffer management control logic is further adapted to adjust the presently allocated amount of memory associated with the reserved portion associated with the requested private pool identifier responsive to allocation of the buffer.

17. The controller of claim 16
wherein each of the plurality of processes is further adapted to transmit to the buffer management control logic a request to free a previously allocated buffer,
wherein the buffer management control logic, responsive to receipt of the request to free a previously allocated buffer, is further adapted to determine the private pool identifier with which the previously allocated buffer is associated and is further adapted to adjust the presently allocated amount of memory associated with the reserved portion associated with the determined private pool identifier.

18. The controller of claim 17 further comprising:

a queue memory coupled with the buffer management control logic and adapted to store queued requests to allocate a buffer, wherein the buffer management control logic is further adapted to queue the request to allocate in the queue if: there is insufficient non-reserved memory in the shared pool to allocate the buffer and the presently allocated amount of memory associated with the reserved portion associated with the requested private pool identifier is not less than the associated minimum size, wherein the buffer management control logic, responsive to receipt of the request to free, is further adapted to re-process a previously queued request to allocate stored in the queue.

19. The controller of claim 18 wherein the request to allocate the buffer further comprises a callback function identifier, wherein the buffer management control logic is further adapted to re-process a request to allocate by invoking a function identified by the callback function identifier.

* * * * *